(12) United States Patent
Moore (10) Patent No.: US 11,645,154 B2
(45) Date of Patent: May 9, 2023

(54) ENHANCED RECOVERY FROM EXTERNALLY INITIATED ADJUNCT PROCESSOR QUEUE RESET

(71) Applicant: INTERNATIONAL BUSINESS MACHINES CORPORATION, Armonk, NY (US)

(72) Inventor: Richard John Moore, Waterlooville (GB)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 17/303,791

(22) Filed: Jun. 8, 2021

(65) Prior Publication Data
US 2022/0391286 A1    Dec. 8, 2022

(51) Int. Cl.
*G06F 11/07* (2006.01)
*G06F 11/14* (2006.01)
(Continued)

(52) U.S. Cl.
CPC ...... *G06F 11/1405* (2013.01); *G06F 9/30145* (2013.01); *G06F 9/542* (2013.01);
(Continued)

(58) Field of Classification Search
CPC .. G06F 11/1405; G06F 9/30145; G06F 9/542; G06F 9/546; G06F 11/076; G06F 11/1441; G06F 21/72; G06F 9/45533
See application file for complete search history.

(56) References Cited

U.S. PATENT DOCUMENTS

| 5,440,688 A | 8/1995 | Nishida |
| 6,237,079 B1 | 5/2001 | Stoney |

(Continued)

FOREIGN PATENT DOCUMENTS

| EP | 2483757 B1 | 8/2012 | |
| WO | WO-2011026084 A1 * | 3/2011 | ........... G06F 1/3203 |

OTHER PUBLICATIONS

US Pending U.S. Appl. No. 17/122,346, entitled "Command-Type Filtering Based on Per-Command Filtering Indicator", filed Dec. 15, 2020, 55 Pages.
(Continued)

*Primary Examiner* — Matthew M Kim
*Assistant Examiner* — Kyle Emanuele
(74) *Attorney, Agent, or Firm* — Teddi E. Maranzano (57) ABSTRACT

A method, computer program product, and computer system are provided. An adjunct processor receives an indication to reset a message queue. The reset removes all messages from the message queue on the adjunct processor. The reset is in response to a hardware failure or an external manual operation. An operation to enqueue a message to the message queue is received. Based on completing a successful enqueue operation, the adjunct processor sets a status that includes an indication that the enqueue operation is a first operation following the reset. A requestor receives the indication of the first operation. Based on the internal count of pending messages being greater than one, the requestor requeues to the adjunct processor, the message requests, except for the first message, having outstanding replies, and resets the indication of the first enqueue operation upon the requeuing of the message requests being complete.

20 Claims, 8 Drawing Sheets

(51) Int. Cl.
  *G06F 9/54* (2006.01)
  *G06F 9/30* (2018.01)
  *G06F 21/72* (2013.01)
  *G06F 9/455* (2018.01)

(52) U.S. Cl.
  CPC ............ *G06F 9/546* (2013.01); *G06F 11/076* (2013.01); *G06F 11/1441* (2013.01); *G06F 21/72* (2013.01); *G06F 9/45533* (2013.01)

(56) References Cited

U.S. PATENT DOCUMENTS

| | | |
|---|---|---|
| 7,177,963 B2 | 2/2007 | Burns |
| 7,549,089 B1 | 6/2009 | Kimmel |
| 7,788,470 B1 | 8/2010 | Purcell |
| 7,836,129 B2 | 11/2010 | Freimuth |
| 9,560,109 B2 | 1/2017 | Wilson |
| 10,540,219 B2 | 1/2020 | Tomlin |
| 10,657,085 B2 | 5/2020 | Gainey, Jr. |
| 2010/0100656 A1* | 4/2010 | Gainey, Jr. ............. G06F 13/24 710/263 |
| 2016/0034324 A1 | 2/2016 | Liu |
| 2019/0347228 A1 | 11/2019 | Gainey, Jr. |
| 2020/0151037 A1* | 5/2020 | Gomes .................... G06F 9/546 |
| 2022/0391213 A1 | 12/2022 | Gomes |

OTHER PUBLICATIONS

IBM: List of IBM Patents or Patent Applications Treated as Related (Appendix P), Dec. 9, 2022, 2 pages.

* cited by examiner

ENHANCED RECOVERY FROM EXTERNALLY INITIATED ADJUNCT PROCESSOR QUEUE RESET

BACKGROUND

The present invention relates to computer systems, and more specifically to detecting and recovering lost messages following an adjunct processor reset.

Each adjunct processor (AP) cryptographic (crypto) card includes one or more queues for transporting AP messages between the AP crypto card and the message sender. The operating system on the server to which the AP crypto card is attached communicates with the AP crypto card to manage the message queues using privileged instructions. The message queue depth of an AP message queue is a fixed length which can be discovered by the operating system. When enqueuing an AP request message causes the AP message queue to reach capacity, an AP queue full state is returned until at least one AP reply message is dequeued.

An external reset operation may be performed, thereby clearing all AP request messages and AP reply messages from the AP message queue. An application sending and receiving messages from the AP crypto card is not aware when an external reset operation is performed, and under some circumstances, neither is the operating system.

It would be advantageous to detect lost AP messages, determine the AP messages that were lost, and then recover only the AP request messages that were lost due to AP or machine malfunction or AP queue reset.

SUMMARY

A method is provided. An adjunct processor receives an indication to reset a message queue. The reset removes all messages from the message queue on the adjunct processor. The reset is in response to a hardware failure or an external manual operation. An operation to enqueue a message to the message queue is received. Based on completing a successful enqueue operation, the adjunct processor sets a status that includes an indication that the enqueue operation is a first operation following the reset. A requestor receives the indication of the first operation. Based on the internal count of pending messages being greater than one, the requestor requeues to the adjunct processor, the message requests, except for the first message, having outstanding replies, and resets the indication of the first enqueue operation upon the requeuing of the message requests being complete.

Embodiments are further directed to computer systems and computer program products having substantially the same features as the above-described computer-implemented method.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

A cluster of hypervisors (systems) is established to provide physical machine capabilities to one or more virtual machines (VM). Each of the hypervisors executes on a computer, and has available to it all of the functions and facilities (also referred to herein collectively as "resources") of the computer on which it is executing. The resources include software instructions, machine code instructions, microcode and millicode instructions, and/or physical hardware capabilities, including one or more Cryptographic Express PCIe (CEX) adapters. The hypervisors expose a set of the resources to the VMs, and provide a mechanism for ensuring that operations and modifications of the VMs occur in a controlled and predictable manner.

Embodiments of the present invention may be implemented on computer hardware and software that support VMs that are configured with crypto adapters. Here, the contexts of z/VM® and z/Architecture® are used to facilitate understanding of the elements of the present invention. (z/VM® and z/Architecture® are registered trademarks of IBM in the United States).

Three z/Architecture AP instructions use the APQN to address a specific processing cryptographic resource. Of the three instructions:

NQAP (Enqueue Adjunct Processor) places a request message segment on an addressed APQN. Status information is returned in the APQSW to indicate the success of the request. Once the last segment of the current request is placed on the APQ, the NQAP instruction completes and the message request is processed asynchronously. (A work request may be delivered as a number of segments, each requiring separate NQAP instructions. Where multiple segments are needed, the instruction returns the APQ index or entry number (APEX) on successfully receiving the first segment. Subsequent segments require that the associated APEX be specified with the request.) When an entire message is assembled, the CEX adapter is able to be process it. Segmenting may occur at the instigation of either the program or the machine.

DQAP (Dequeue Adjunct Processor) removes the next ready reply message, in segments, from the addressed APQN. Status information is returned in the APQSW of the last segment of the current reply to indicate the success of the reply. Once a reply has been successfully removed, the associated queue element of the APQ becomes free to be used for a subsequent request. Replies may be returned in multiple segments, each requiring a separate DQAP to receive each segment. The first DQAP returns the APEX, which each subsequent DQAP specifies to retrieve the remaining message segments.

PQAP (Process Queue Adjunct Processor) is used in a number of querying and configuration functions relating to individual APQNs, or the entire set of APs and Domains assigned to the program. Once such query function is Test AP Queue (TAPQ), which returns configuration and operational status information about the APQN. The TAPQ also returns whether the associated queue is full or empty and whether the queue is configured for adapter interrupts. This information may be returned in one of the general purpose register operands used.

Conceptually, a CEX adaptor is assigned a unique number, which is its adjunct processor number (APn 0-255). Within each APn there may be assigned up to 256 logically independent processing facilities known as domains. The APn and Domain number pair uniquely identifies a CEX crypto resource with which to process work. Each such pair is served by a work queue which may comprise up to 32 elements, with each element containing at most one request message or its corresponding response message. The number of APn and elements are exemplary, and may vary to include more or fewer, depending on the architectural implementation. Each such queue is known as an AP queue (APQ) and is uniquely identified by the APn and Domain number of the resource it serves. The concatenated AP and Domain numbers may be referred to as the APQN, serve to identify the associated queue.

The APQNs may be externally configured and reset from an administrative console, also referred to as a hardware maintenance console (HMC), without synchronous information being sent to the program of the event. The reset clears the APQN queue by removing all messages that are queued to it. Although programs may maintain their own accounting of numbers of messages in progress with each APQN, a program's accounting of its message count may not match the actual APQN count as a result of the external reset. In this context, the term "program" may refer to an application program, or a requestor. The operating system or hypervisor may also maintain its own internal message count. However, the hardware (crypto adapter 21) does not maintain a count of messages on its queue. In an example implementation, this would require a counter on the crypto adapter 21 for each of the 256 APQNs, as well as additional logic to serialize and update the counters. Managing the counters would add unnecessary overhead and impact message processing performance.

Because the hardware does not maintain a queue count, this mis-match between the program's queue count and the actual queue count may continue for an indefinite number of processing cycles until the program eventually experiences an error, for example a program hang, waiting for a non-existent reply. As another example, the program may attempt to enqueue a message to the APQN, but receive a "queue full" indicator because the program queue count erroneously indicates space is available for the new message. As a further example, the program may attempt, in error, to dequeue a reply but receive a "queue empty" indicator because of a queue count mismatch. When the program receives these types of errors, recovery comprises resetting the affected queue and restarting the failed program environment. This causes requeuing all the messages to that APQN, since the program is not aware which messages were successfully processed prior to the reset. This case will be described more fully with reference to FIG. 3.

Common methods to recognize an error condition, such as an operation timeout or exceeding a threshold are not useful in recognizing the need for recovery following an external queue reset. This is because the multiple segments that comprise multiple messages may be interleaved. The responses may be ready in a different order from their sending, and a message may consist of several separately queued segments. The time taken to complete a reply may vary from a few milliseconds to many minutes depending on the complexity of the request. It is difficult therefore to predict a reasonable timeout. Any threshold might falsely signal the need for message recovery where none is due.

Counters implemented in the hardware are another means to track the number of messages on a particular message queue. However, counters occupy valuable register space and must be extended if the queue depth is increased in a future enhancement. Further, implementing counters in hardware requires the allocation in the hardware system area of one counter for each APQ. This is a significant storage reservation when multiplied by the number of architected queues.

The introduction of the "O" bit solves the problem of accounting for lost messages in a way that is independent of queue depth because it recognizes that that transition from zero to one queue entry is the significant factor. Because of this, no additional space in the hardware system area is needed to support the "O" bit. The "O" bit determination falls out of the algorithm used to search for an unused queue slot, which may be derived from a bit mask of used queue entries maintained in hardware system area, or may be determined dynamically by searching the 32 queue entries. The use of the bit mask, which is a natural construct regardless of providing support for the "O" bit provides the "O" bit determination at minimal cost, i.e. one instruction to determine whether the bit mask is zero before assigning a new queue entry.

Figure 2:
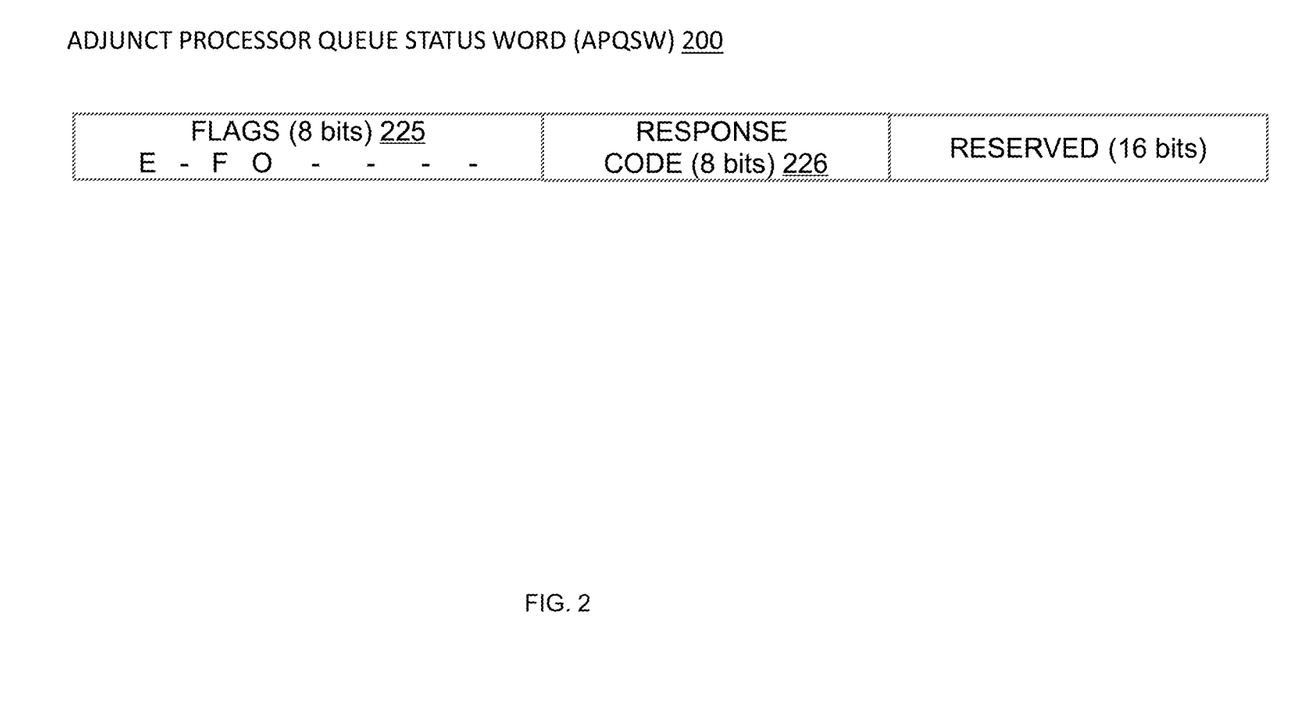
FIG. 2 illustrates a view of an enhanced Adjunct Processor Queue Status Word (APQSW) 200 in accordance with one or more aspects of the present invention.

NQAP, DQAP and PQAP-TAPQ return some information about the state of the APQN in the APQSW, such as the response code 226 depicted in FIG. 2, but information about the precise use and state of the queue is not returned. Referring to the flags 225, a partially filled queue will have both "E" and "F" bits set to zero, since the queue is neither empty nor full. Only a full queue will have the "F" bit set and only an empty queue will have the "E" bit set. Note in particular, a successful NQAP cannot have the "E" bit set, nor can both the "E" and the "F" bits be set simultaneously. The APQSW may include additional status bits that may participate in other embodiments of this invention.

Other status indicators include a reply code that is used to indicate success in initiating the request, which occurs asynchronously. There are also a return code and reason code that the AP crypto card issues in the APQSW to indicate the success of executing the request. The APQSW is returned to the program in a general purpose register following the completion of the AP instruction. In this implementation, general purpose register 1 is used, but different register may be used depending on the particular implementation.

The instructions that operate on the APQN are implemented in millicode. The instructions are both privileged and complex, thereby being an inefficient use of computing resource to have to repeat work for recovery. Therefore, embodiments of the present invention ensure that the program discovers message losses, co-incidentally with the next attempt to enqueue a message to the reset APQN. A new status bit (the "O" bit in flags 225 of FIG. 2) in the APQSW is set when the APQN transitions from zero entries to one entry, indicating that the first message, or first message segment, following the reset is enqueued successfully. The new status bit minimizes waste of limited register space by using a previously undefined bit in the APQSW. Note that the availability of register space for future additional information to be returned is limited due to considerations including: a) the size of registers; b) competition for space due to simultaneous items of status information that must be returned; and c) backward compatibility with programs that might be unaware of new bit assignments within registers. Also, the use of a single status bit is independent of the maximum number of supported queue entries, which, depending on the implementation, may vary.

In one embodiment, the "O" bit remains set until the program acknowledges the presence of the set "O" bit. In a usual implementation, the program may use a loop to enqueue multiple segments of an incomplete message. The millicode may leave the "O" bit set and leave the resetting to the program once the presence of the set "O" bit is acknowledged. Thus, with message segmentation a program may complete the enqueuing of the segmented message before attending to the recovery of prior messages caused by the external reset. In an alternative embodiment, the NQAP instruction millicode may reset the O-bit automatically when the associated queue transitions from one entry to any other number of entries.

The APQSW may include bits in addition to the "E", "F", and "O" bits that may participate in other embodiments of this invention. However, the present embodiment highlights the use of the "E", "F", and "O" bits.

From the program perspective, replies to requests are delivered asynchronously, hence the need for a success indication for initiation, a reply code, and a success indication for completion. The requests are delivered to an internal queue in the computer's hardware system area. A separate piece of computer firmware processes that queue. Following validation, the request is sent to firmware on the AP crypto card, which routes the request to the AP crypto card's crypto chip, or one of the crypto chip's agents. Failure indicators, reply codes and reason codes may be returned as a reply to the message initiation.

Although the present invention is described with respect to cryptographic message queuing capabilities, it could readily be applied to other capabilities of a computing system, such as message queuing in an I/O subsystem.

Figure 1:
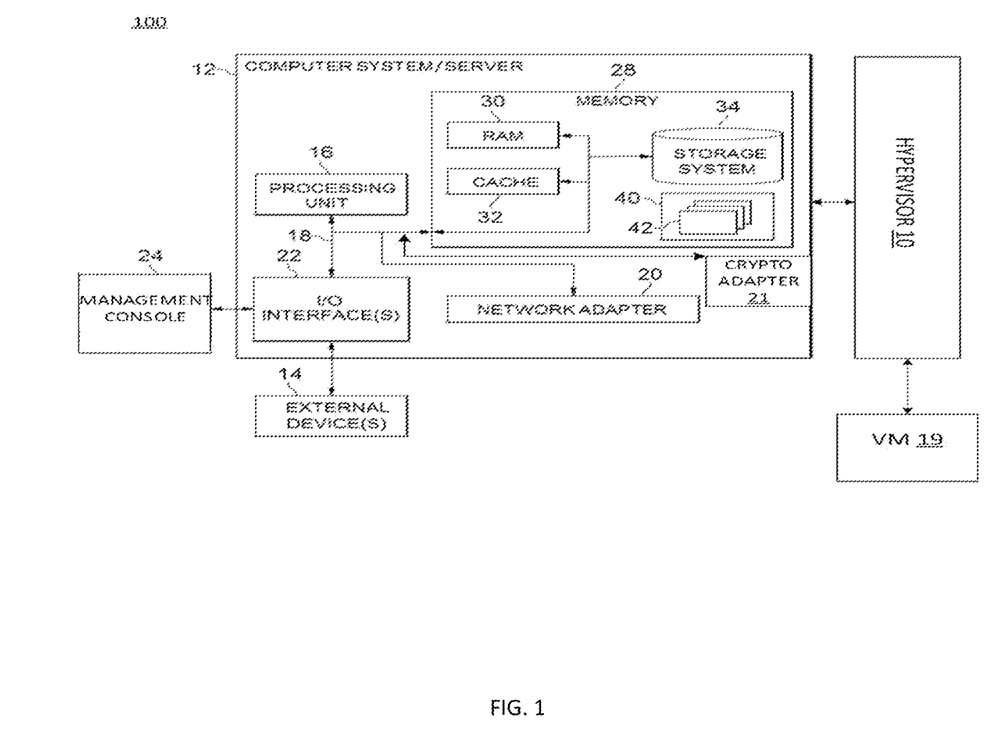
FIG. 1 is a functional block diagram of an illustrative system, according to an embodiment of the present invention.

Referring now to the figures, FIG. 1 is a functional block diagram of an illustrative virtualized environment (system) 100, according to an embodiment of the invention.

As shown, the system 100 includes one or more computer system/servers (server) 12, one of which is shown. The server 12 may include any computer capable of including a hypervisor 10, which enables virtualizing the server 12 hardware to support one or more optional virtual guests, such as VM1 19.

The functions and processes of server 12 may be described in the context of computer system-executable instructions, such as program modules, routines, objects, data structures, and logic, etc. that perform particular tasks or implement particular abstract data types. The server 12 can be part of a distributed cloud computing environment, and may enable creation of multiple VMs, when a hypervisor 10 is installed on the server 12.

As shown in FIG. 1, the server 12 may include, but is not limited to, one or more processors or processing units 16, a system memory 28, and a bus 18 that couples various system components including system memory 28 to processor 16.

Bus 18 represents one or more of several types of bus structures, including a memory bus or memory controller, a peripheral bus, an accelerated graphics port, and a processor or local bus using any of a variety of bus architectures.

The server 12 typically includes a variety of computer system readable media. Such media may be any available media that is accessible by computer system/server 12, and it includes both volatile and non-volatile media, removable and non-removable media.

The memory 28 can include computer system readable media in the form of volatile memory, such as random access memory (RAM) 30 and/or cache memory 32. The memory 28 may include a hardware system area, which is indirectly accessible and not visible to programs executing on the processor 16. Here, indirectly accessible is used to mean that the hardware system area and the adjunct processor queue(s) stored in the hardware system area are only accessible by specific limited instructions and not otherwise accessible (e.g., cannot load into it, programs are unaware of addresses, etc.). Located within the memory 28 are one or more adjunct processor queues. These queues are not directly visible from user programs and are instead considered a part of the processor 16, memory 28, and adjunct processor(s) (crypto adapter 21).

A processor 16 has access to the queues in memory 28 by, for instance, issuing instructions to place requests on the queue, and/or to remove replies from the queue. The adjunct processor has direct access to the queues via a transport layer and takes requests off the queue, processes the requests, and places replies to the requests on the queue. Therefore, the message flow may comprise the program issuing AP instructions to a queue that is actually in the hardware system area, potentially 256 queues having 32 elements each. The transport layer firmware validates a request to the extent possibly within the constraints of performing real I/O to the bus connected to the crypto adapter 21 and sends the request to the firmware on the crypto adapter 21.

The server 12 may further include other removable/non-removable, volatile/non-volatile computer system storage media. For example, storage system 34 can include a non-removable, non-volatile magnetic media, e.g., a "hard drive" and an optical disk drive for reading from or writing to a removable, non-volatile optical disk such as a CD-ROM, DVD-ROM or other optical media. Each device in the storage system 34 can be connected to bus 18 by one or more data media interfaces, such as I/O interface 22.

Each program 40 represents one of a plurality of programs that are stored in the storage system 34 and are loaded into the memory 28 for execution. A program 40 includes an instance of an operating system, an application, a system utility, or similar. Each program 40 includes one or more modules 42. Upon activation of the VMs, the hypervisor 10 can cause the profiles of the various VMs to load into hypervisor 10 memory, where they populate the configuration parameters and resources of the VMs. It should be noted that even when the server 12 includes the hypervisor 10, a VM is not required. In that case, the physical resources of the server 12 are not virtualized.

The server 12 may also communicate with one or more external devices 14 such as a keyboard, a pointing device; and/or any devices (e.g., network card, modem, etc.) that enable the server 12 to communicate with one or more other computing devices. Such communication can occur via Input/Output (I/O) interfaces 22.

In terms of serialization of the adjunct processor queues in the hardware system area, the operating system maintains a representation of the adjunct processor queue in its memory. There is one instance of the operating system data structure per adjunct processor queue. The operating system may obtain an exclusive lock on the data structure before operations are executed against the hardware. This serialization ensures that other processors cannot execute operations against the adjunct processor queue. The operating system maintains its queue count and other status information in this data structure. The operating system may also use the data structure to point to memory copies of messages it has sent to the adjunct processor queue.

Having the adjunct processors uniquely assigned to only one VM prevents the adjunct processors from being visible to other processors in the server that are not assigned to the operating system instance in the VM.

Serialization of the CEX adapters at the server hardware level may include the server firmware employing a similar locking mechanism as used at the operating system level. In some implementations, such as the z/Architecture®, multiple levels of millicode and firmware may cooperate to serialize the path from the program to the operating system and to performing real I/O on the PCIe bus.

The management console 24, includes specialized software to communicate with the hypervisor 10 component of the server 12 through the I/O interface 22 to manage the configuration and state of VMs. Using the management console 24 an administrator having the appropriate security authorization defines and modifies VMs, assigns servers to domains and subdomains, and assigns hardware, particularly cryptographic adapters (21) to servers and VMs. The administrator may also perform a reset operation on one or more APQNs which causes the draining of messages in the APQN, and cause the hypervisor 10 and/or OS 40 to initiate a process to recover the lost messages.

The server 12 can communicate with one or more networks via network adapter 20. As depicted, network adapter 20 communicates with the other components of the server 12 via bus 18. Although not shown, other hardware and/or software components could be used in conjunction with the server 12. Examples include, but are not limited to: microcode, device drivers, redundant processing units, external disk drive arrays, RAID systems, tape drives, and data archival storage systems. In the present invention, the server 12 can illustrate a physical hardware and software implementation. The server 12 can also illustrate a virtual implementation of a physical server, for example, a VM.

Figure 3:
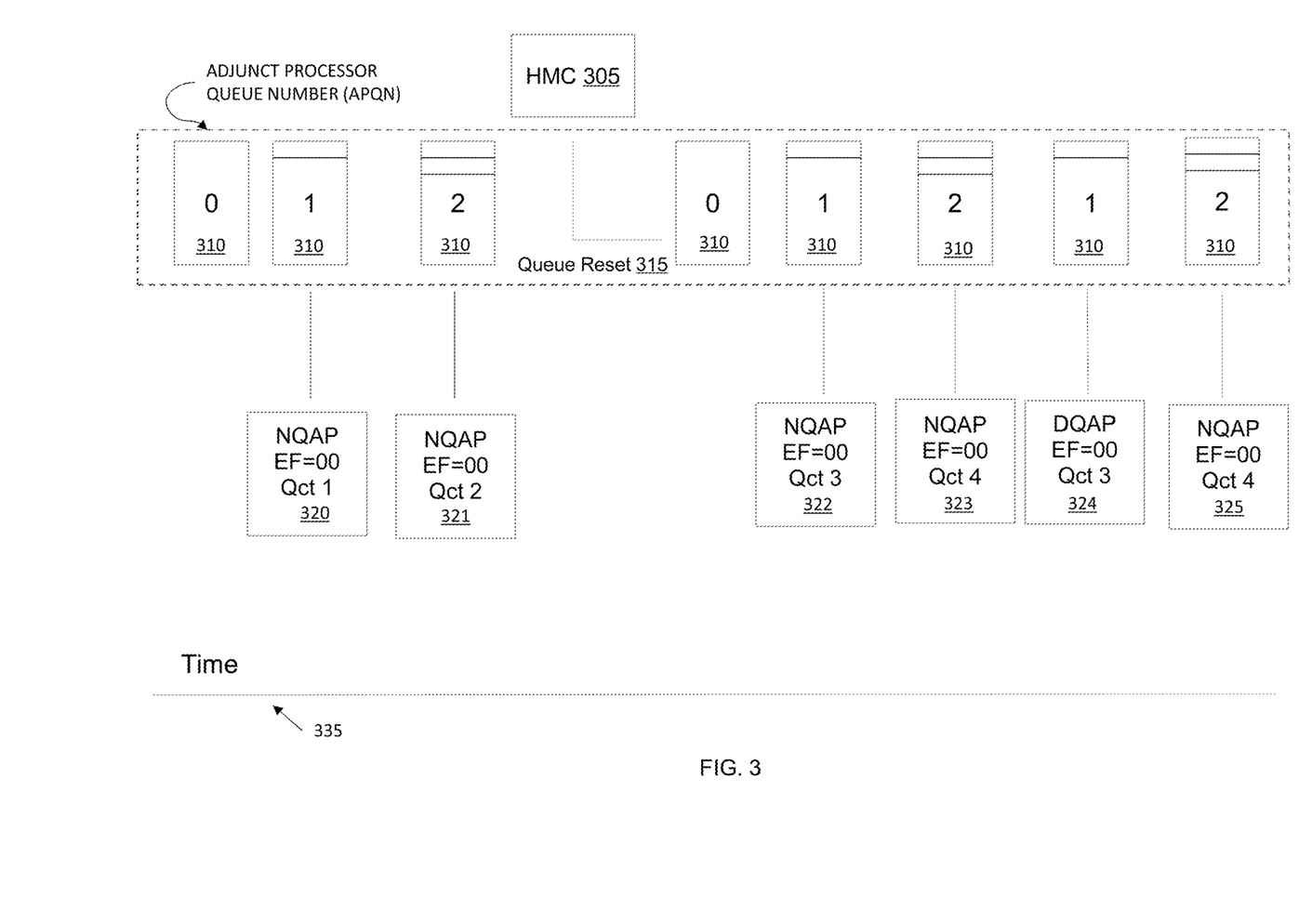
FIG. 3 illustrates a view of an effect of an external reset on an Adjunct Processor Queue followed by an enqueue operation, according to an embodiment of the present invention.

Turning now to FIG. 3, a view of an effect of an external reset on an APQN is illustrated. The APQN 310 resides in the hardware system area. Each operation 320-325 depicts the result of successfully executing an AP instruction against the APQN 310 over time 335.

Initially, the APQN 310 has zero messages enqueued. Following the NQAP operation 320, one message is enqueued to APQN 310 (Qct 1). The "E" and "F" bits are zeroes because the queue is neither empty nor full. Operation 321 is another NQAP, after which there are now two messages enqueued (Qct 2), and the "E" and "F" bits are still zeroes.

An administrator having the appropriate security permissions, performs an external queue reset 315 of APQN 310 from the HMC 305, clearing the two enqueued messages, and returning the queue count to zero. Operation 322 illustrates the effect of the external queue reset 315 on the APQN 310. Following the NQAP, there is one message enqueued. However, from the program's perspective, there are three messages enqueued because the program is not aware of the external queue reset 315. As in operation 320, the "E" and "F" bits are still zeros. The effect of the NQAP operation 323 on the APQN 310 is similar to that of the operation 322, in that the real queue count is incremented to "2", but the program incorrectly continues to increment its count, now at "4".

Following the DQAP operation 324, one message is dequeued from APQN 310. This operation does not cause a change in the "E" and "F" bits. Although the APQN 310 and the program correctly decrement their respective counts, the program's queue count remains incorrect because it does not reflect the effect of the external queue reset 315.

The execution of AP queue instructions against the APQN 310 continue with the NQAP operation 325. The combination of NQAP, DQAP, and PQAP instructions may continue until the program eventually experiences an error, for example a program hang, waiting for a non-existent reply.

Figure 4:
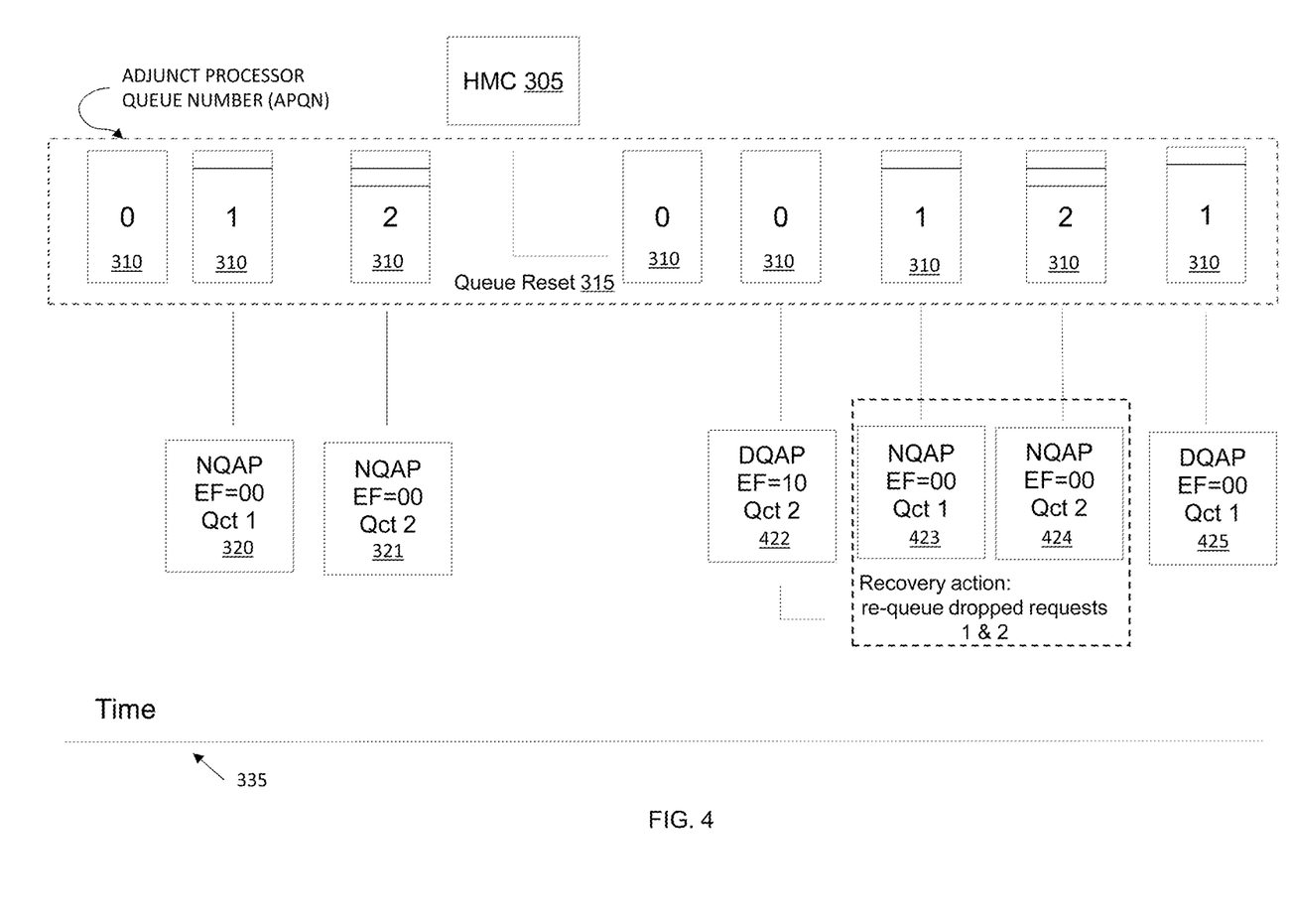
FIG. 4 illustrates a view of an effect of an external reset on an Adjunct Processor Queue followed by a dequeue operation, according to an embodiment of the present invention.

FIG. 4 illustrates a view of an effect of an external reset on an APQN followed by a DQAP operation, according to an embodiment of the present invention. Processing of the operations 320, 321 and the external queue reset 315 are substantially similar to that described in FIG. 3. In contrast to FIG. 3, a DQAP operation 422 is the first operation following the external queue reset 315. The program is still unaware of the external queue reset 315, and still maintains an incorrect queue count of "2". However, the "E" bit is set in the hardware following the execution of the DQAP instruction because there was not a message to dequeue. The queue status is returned to the program in the APQSW. The program recognizes the discrepancy between having the "E" bit set and its internal queue count being "2". The architected recovery action in this case is to requeue the two messages that were in the APQN 310 following the NQAP operation 321, and that were cleared as a result of the external queue reset 315. This is shown in the NQAP operations 423 and 424. The program may access an address in the hardware system area which points to a structure having the original message request, the requestor, and a pointer to the reply, if any. Upon reset, the program searches the structure for messages that have outstanding replies, and requeues the message request. In the NQAP operation 423, the "E" bit is unset and the queue count in the program is correctly set to one.

Figure 5:
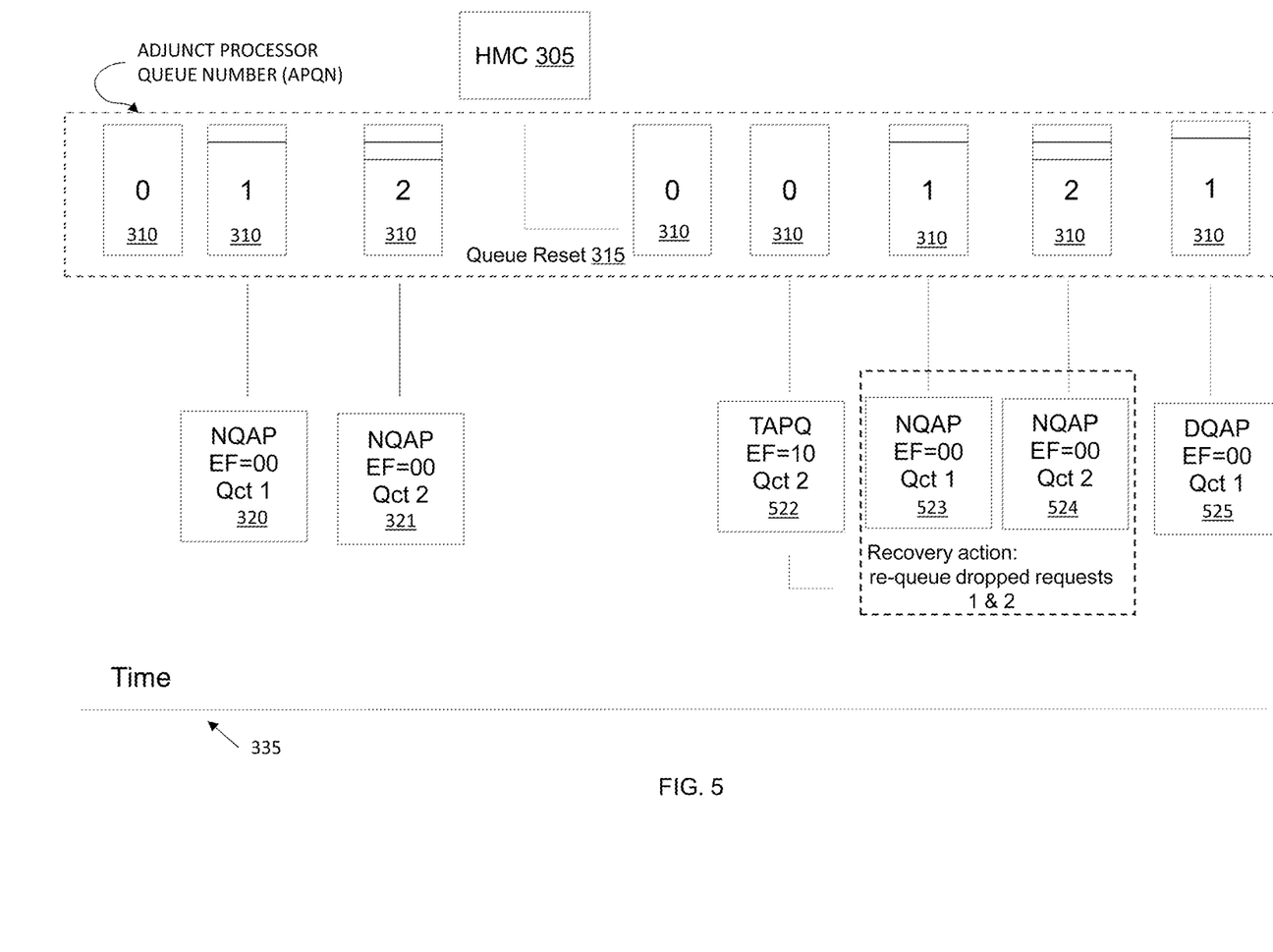
FIG. 5 illustrates a view of an effect of an external reset on an Adjunct Processor Queue followed by a test queue operation, according to an embodiment of the present invention.

FIG. 5 illustrates a view of an effect of an external reset on an APQN followed by a TAPQ test queue operation, according to an embodiment of the present invention. Processing of the operations 320, 321 and the external queue reset 315 are substantially similar to that described in FIG. 3. In contrast to FIGS. 3 and 4, a TAPQ is the first operation 522 following the external queue reset 315. The program is still unaware of the external queue reset 315, and still maintains an incorrect queue count of "2". However, the "E" bit is set in the hardware to indicate the APQN 310 is empty, and this status is returned to the program in the APQSW. The program recognizes the discrepancy between having the "E" bit set and its internal queue count being "2". The architected recovery action in this case is to requeue the two messages that were in the APQN 310 following the NQAP operation 321, and that were cleared as a result of the external queue reset 315. This is shown in the NQAP operations 523 and 524. As in FIG. 4, the program may access an address in the hardware system area which points to a structure having the original message request, the requestor, and a pointer to the reply, if any. Upon reset, the program searches the structure for messages that have outstanding replies, and requeues the message request. In the NQAP operation 523, the "E" bit is unset and the queue count in the program is correctly set to one. The following operations, NQAP 524 and DQAP 525, correctly reflect the hardware queue count in the program.

As seen in FIGS. 4 and 5, recovery from the external queue reset 315 is possible because following the external queue reset 315, the hardware sets the "E" bit in the APQSW. This alerts the program that its internal queue count cannot be correct and that recovery is needed. However, as shown in FIG. 3, a similar hardware notification to the program is not currently architected.

Figure 6:
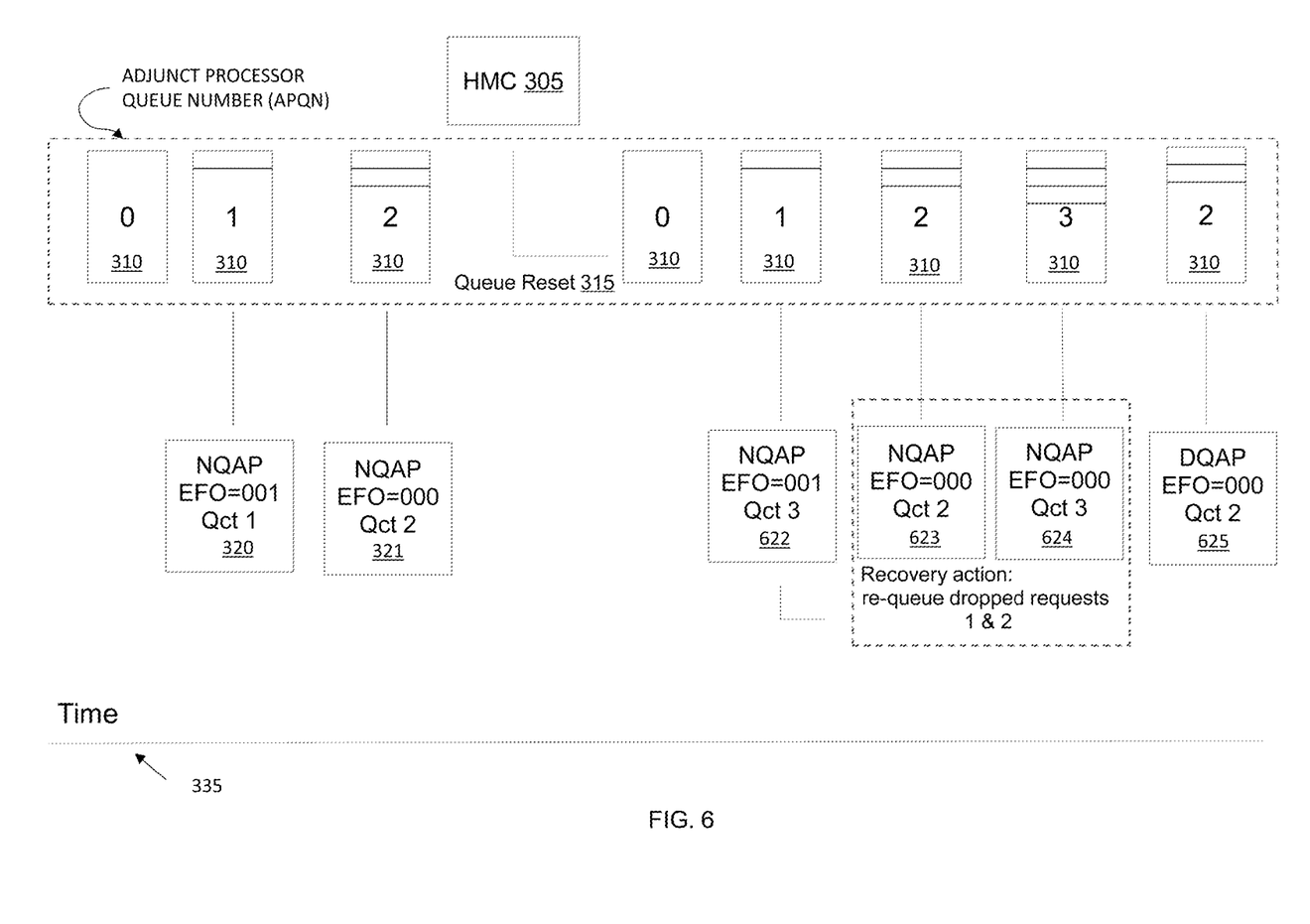
FIG. 6 illustrates a view of an enhanced effect of an external reset on an Adjunct Processor Queue, according to an embodiment of the present invention.

FIG. 6 illustrates alerting the program that recovery is needed following the external queue reset 315, by implementing the "O" status bit in the APQSW.

Processing of the operations 320, 321 and the external queue reset 315 are substantially similar to that described in FIG. 3.

In the NQAP operation 622, the "O" bit is set to reflect the first successful enqueue following the external queue reset 315 and is returned to the program in the AQPSW. Note that prior to the external queue reset 315, the program correctly maintained an internal count of "2" messages, but following the external queue reset 315, as in FIG. 3, the program's queue count is incorrect. However, in contrast to the NQAP operation 322 of FIG. 3, the set "O" bit notifies the program that recovery is needed. As in FIGS. 4 and 5, the architected recovery action in this case is to requeue the two messages that were in the APQN 310 following the NQAP operation 321, and that were cleared as a result of the external queue reset 315. This is performed in a similar manner to FIG. 4. The program may access an address in the hardware system area which points to a structure having the original message request, the requestor, and a pointer to the reply, if any. Upon reset, the program searches the structure for messages that have outstanding replies, and requeues the message request. This is shown in the NQAP operations 623 and 624. In the NQAP operation 623, the "O" bit is unset and the queue count in the program is correctly set to "2".

Figure 7A:
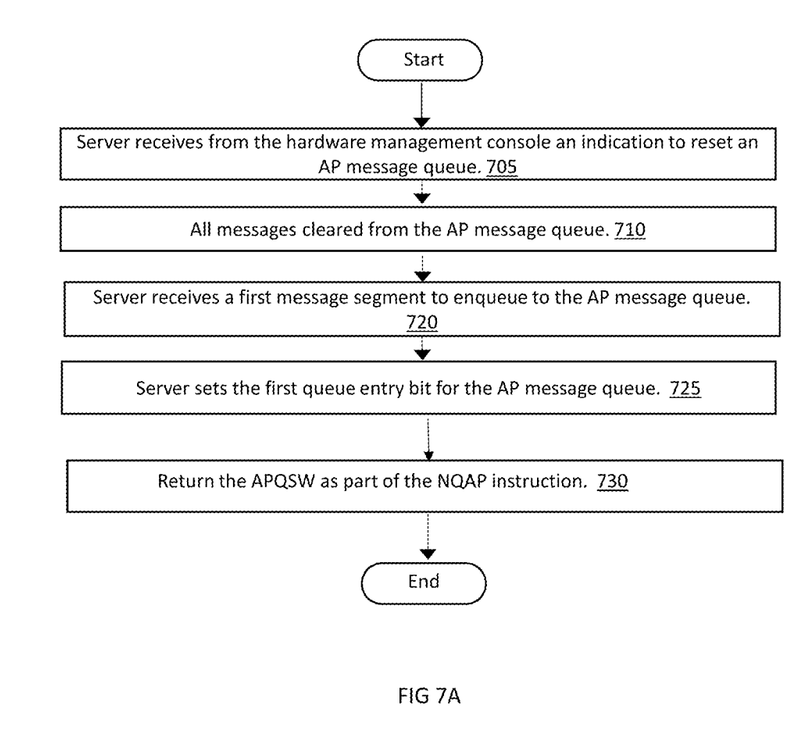
FIG. 7A illustrates a flow chart of server/hardware recovery actions from externally initiated Adjunct Processor Queue reset, according to an embodiment of the present invention.

FIG. 7A illustrates a flow chart of server/hardware recovery actions from an externally initiated Adjunct Processor Queue reset where the "O" bit is implemented. FIG. 7A begins when an administrative action to reset an APQN is received at the server (705). The command may be directed to more than one APQN, depending on the operands of the command. At 710, the server communicates to the APQN to reset, which causes all messages to be cleared from the APQN.

At 720, the server receives from a program a first message to enqueue to the APQN. This may be a first message or a first segment of a multi-segment message. At 725, if first message (or first segment of the multi-segment message) is successfully enqueued, the AP card millicode sets the "O" status bit in the APQSW. The APQSW is returned to the program (730).

Figure 7B:
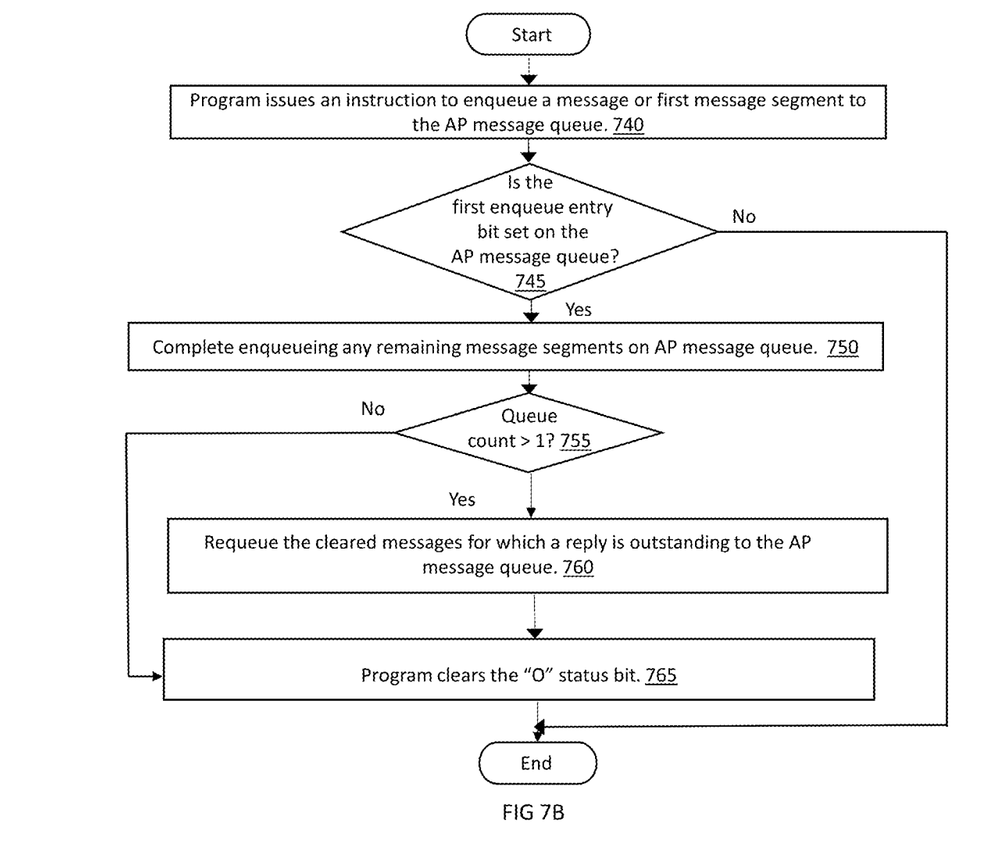
FIG. 7B illustrates a flow chart of program recovery actions from externally initiated Adjunct Processor Queue reset, according to an embodiment of the present invention.

FIG. 7B illustrates a flow chart of program recovery actions from externally initiated Adjunct Processor Queue reset, according to an embodiment of the present invention.

At 740, the program issues an instruction to enqueue a message (or a first segment of a multi-segment message) to the APQN. The program checks the APQSW returned at the completion of the enqueue operation. Assuming a successful operation, the program increments its internal count of pending messages, and checks for the presence of the "O" bit being set (745). If the "O" bit is not set, the process ends.

Returning to 745, if the "O" bit is set, the program may complete enqueuing the segments of a multi-segment message (750) before recovering any prior messages. If the program's internal count of pending messages is greater than one, (755) then there are messages to recover. The program accesses an address in the hardware system area to locate a pointer to a structure having message requests with outstanding replies. At 760, the program requeues messages to the APQN for which a reply is outstanding, incrementing the program's internal count of pending messages for each recovered message. Following 760, the recovery condition is cleared, and the program clears the "O" bit at 765.

Returning to 755, if the queue count is not greater than one, then there are no messages to recover, and the program can clear the "O" bit at 765.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be constructed to maintain the proper protection for the invention first described.

What is claimed is:

1. A method, comprising:
    receiving by an adjunct processor an indication to reset a message queue, wherein the reset removes all messages from the message queue on the adjunct processor, and wherein the reset is in response to a hardware failure or an external manual operation;
    receiving by the adjunct processor an operation to enqueue a message to the message queue on the adjunct processor; and
    based on completing a successful enqueue operation, the adjunct processor setting a status that includes an indication that the enqueue operation is a first operation following the reset.

2. The method of claim 1, further comprising:
    in response to receiving from the adjunct processor the indication of the operation being a first enqueue operation following the reset, a requestor comparing an internal count of pending messages previously sent to the adjunct processor;
    based on the internal count of pending messages being greater than one, the requestor requeuing to the adjunct processor, the message requests, except for a first message, having outstanding replies; and
    the requestor resetting the indication of the first enqueue operation upon the requeuing of the message requests being complete.

3. The method of claim 2, wherein the requeuing further comprises:
    the requestor searching structures in a hardware system area wherein each structure comprises an original message request, a requestor identification, and a pointer to a reply message;
    for each structure, using a correlator to determine whether a reply is outstanding for the message identified in the structure;
    based on there being an outstanding reply, requeuing the original message request, wherein the original message request comprises a plurality of message segments; and
    unsetting the indication of the first enqueue operation upon receiving a notification that the plurality of segments of the original message request is successfully enqueued.

4. The method of claim 1, wherein a requestor communicates with the adjunct processor through a hardware system area, wherein the hardware system area is indirectly accessible to the requestor by specific limited instructions, and is not otherwise accessible to the requestor.

5. The method of claim 1, wherein the adjunct processor message queue is stored in a hardware storage area, wherein the adjunct processor directly accesses the message queue through a transport layer that is dedicated to dequeuing request messages, processing message requests, and queuing message replies to the adjunct message queue.

6. The method of claim 1, wherein a requestor is an application.

7. The method of claim 1, wherein a status word includes a response code, a return code, an indication that the enqueue operation is a first operation following the reset, a queue not empty indicator, and a queue not full indicator, and wherein a requestor receives the status word from the adjunct processor following a completion of one of specific limited instructions.

8. A computer program product, the computer program product comprising a non-transitory tangible storage device having program code embodied therewith, the program code executable by a processor of a computer to perform a method, the method comprising:
  receiving by an adjunct processor an indication to reset a message queue, wherein the reset removes all messages from the message queue on the adjunct processor, and wherein the reset is in response to a hardware failure or an external manual operation;
  receiving by the adjunct processor an operation to enqueue a message to the message queue on the adjunct processor; and
  based on completing a successful enqueue operation, the adjunct processor setting a status that includes an indication that the enqueue operation is a first operation following the reset.

9. The computer program product of claim 8, further comprising:
  in response to receiving from the adjunct processor the indication of the operation being a first enqueue operation following the reset, a requestor comparing an internal count of pending messages previously sent to the adjunct processor;
  based on the internal count of pending messages being greater than one, the requestor requeuing to the adjunct processor, the message requests, except for a first message, having outstanding replies; and
  the requestor resetting the indication of the first enqueue operation upon the requeuing of the message requests being complete.

10. The computer program product of claim 9, wherein the requeuing further comprises:
  the requestor searching structures in a hardware system area wherein each structure comprises an original message request, a requestor identification, and a pointer to a reply message;
  for each structure, using a correlator to determine whether a reply is outstanding for the message identified in the structure;
  based on there being an outstanding reply, requeuing the original message request, wherein the original message request comprises a plurality of message segments; and
  unsetting the indication of the first enqueue operation upon receiving a notification that the plurality of segments of the original message request is successfully enqueued.

11. The computer program product of claim 8, wherein a requestor communicates with the adjunct processor through a hardware system area, wherein the hardware system area is indirectly accessible to the requestor by specific limited instructions, and is not otherwise accessible.

12. The computer program product of claim 8, wherein the adjunct processor message queue is stored in a hardware storage area, wherein the adjunct processor directly accesses the message queue through a transport layer that is dedicated to dequeuing request messages, processing message requests, and queuing message replies to the adjunct message queue.

13. The computer program product of claim 8, wherein a status word includes a response code, a return code, an indication that the enqueue operation is a first operation following the reset, a queue not empty indicator, and a queue not full indicator, and wherein a requestor receives the status word from the adjunct processor following a completion of one of specific limited instructions.

14. A computer system, comprising:
  one or more processors;
  a memory coupled to at least one of the processors;
  a set of computer program instructions stored in the memory and executed by at least one of the processors in order to perform actions of:
    receiving by an adjunct processor an indication to reset a message queue, wherein the reset removes all messages from the message queue on the adjunct processor, and wherein the reset is in response to a hardware failure or an external manual operation;
    receiving by the adjunct processor an operation to enqueue a message to the message queue on the adjunct processor; and
    based on completing a successful enqueue operation, the adjunct processor setting a status that includes an indication that the enqueue operation is a first operation following the reset.

15. The computer system of claim 14, further comprising:
  in response to receiving from the adjunct processor the indication of the operation being a first enqueue operation following the reset, a requestor comparing an internal count of pending messages previously sent to the adjunct processor;
  based on the internal count of pending messages being greater than one, the requestor requeuing to the adjunct processor, the message requests, except for a first message, having outstanding replies; and
  the requestor resetting the indication of the first enqueue operation upon the requeuing of the message requests being complete.

16. The computer system of claim 15, wherein the requeuing further comprises:
  the requestor searching structures in a hardware system area wherein each structure comprises an original message request, a requestor identification, and a pointer to a reply message;
  for each structure, using a correlator to determine whether a reply is outstanding for the message identified in the structure;
  based on there being an outstanding reply, requeuing the original message request, wherein the original message request comprises a plurality of message segments; and
  unsetting the indication of the first enqueue operation upon receiving a notification that the plurality of segments of the original message request is successfully enqueued.

17. The computer system of claim 15, wherein the requestor is an application.

18. The computer system of claim 14, wherein a requestor communicates with the adjunct processor through a hardware system area, wherein the hardware system area is indirectly accessible to the requestor by specific limited instructions, and is not otherwise accessible.

19. The computer system of claim 14, wherein the adjunct processor message queue is stored in a hardware storage area, wherein the adjunct processor directly accesses the message queue through a transport layer that is dedicated to dequeuing request messages, processing message requests, and queuing message replies to the adjunct message queue.

20. The computer system of claim 14, wherein a status word includes a response code, a return code, an indication that the enqueue operation is a first operation following the reset, a queue not empty indicator, and a queue not full indicator, and wherein a requestor receives the status word from the adjunct processor following a completion of one of specific limited instructions.

* * * * *